Jan. 27. 1925.
L. C. MYERS ET AL
TYPEWRITING MACHINE
Filed July 12, 1923
1,524,148
10 Sheets-Sheet 1
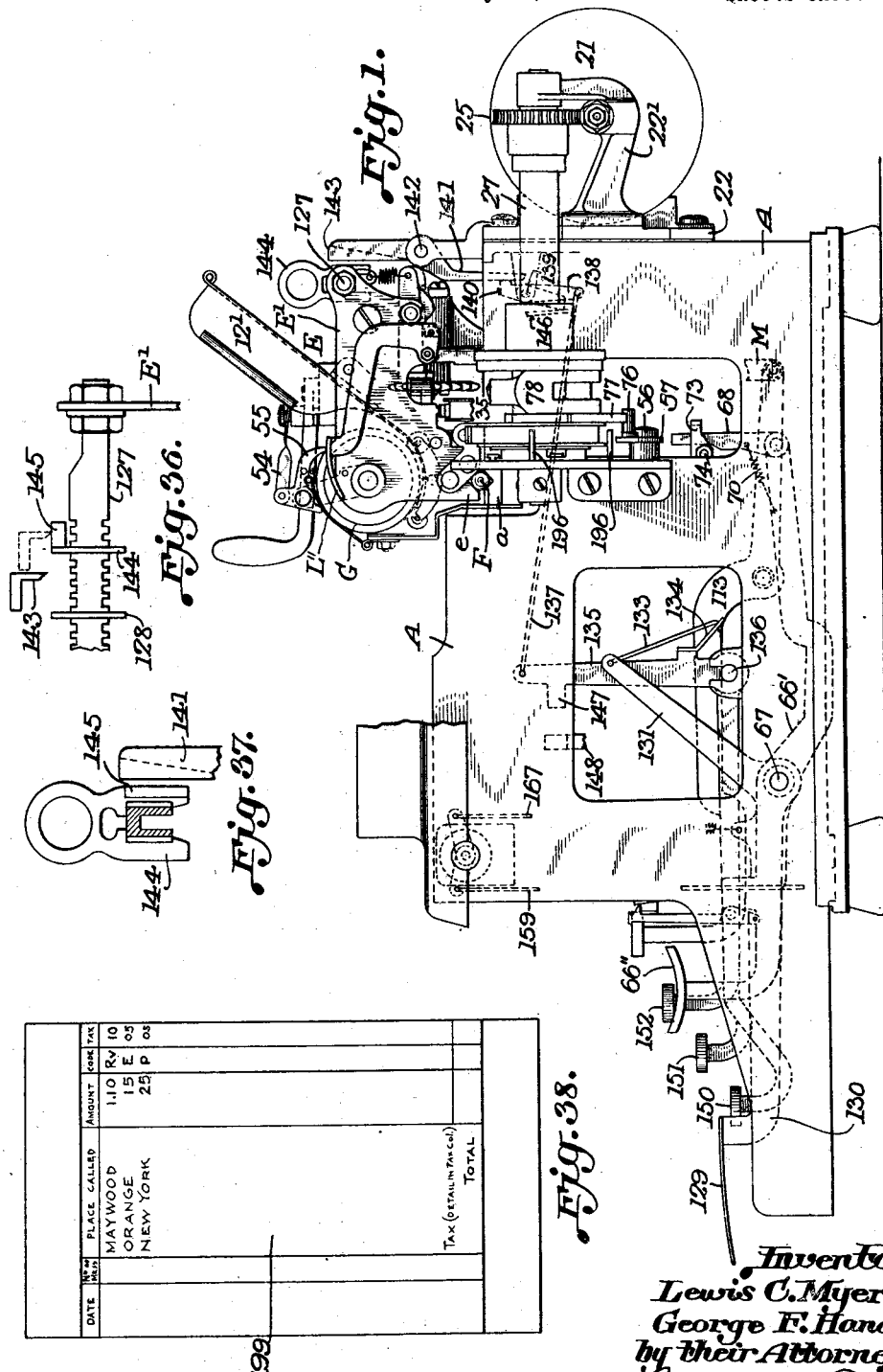

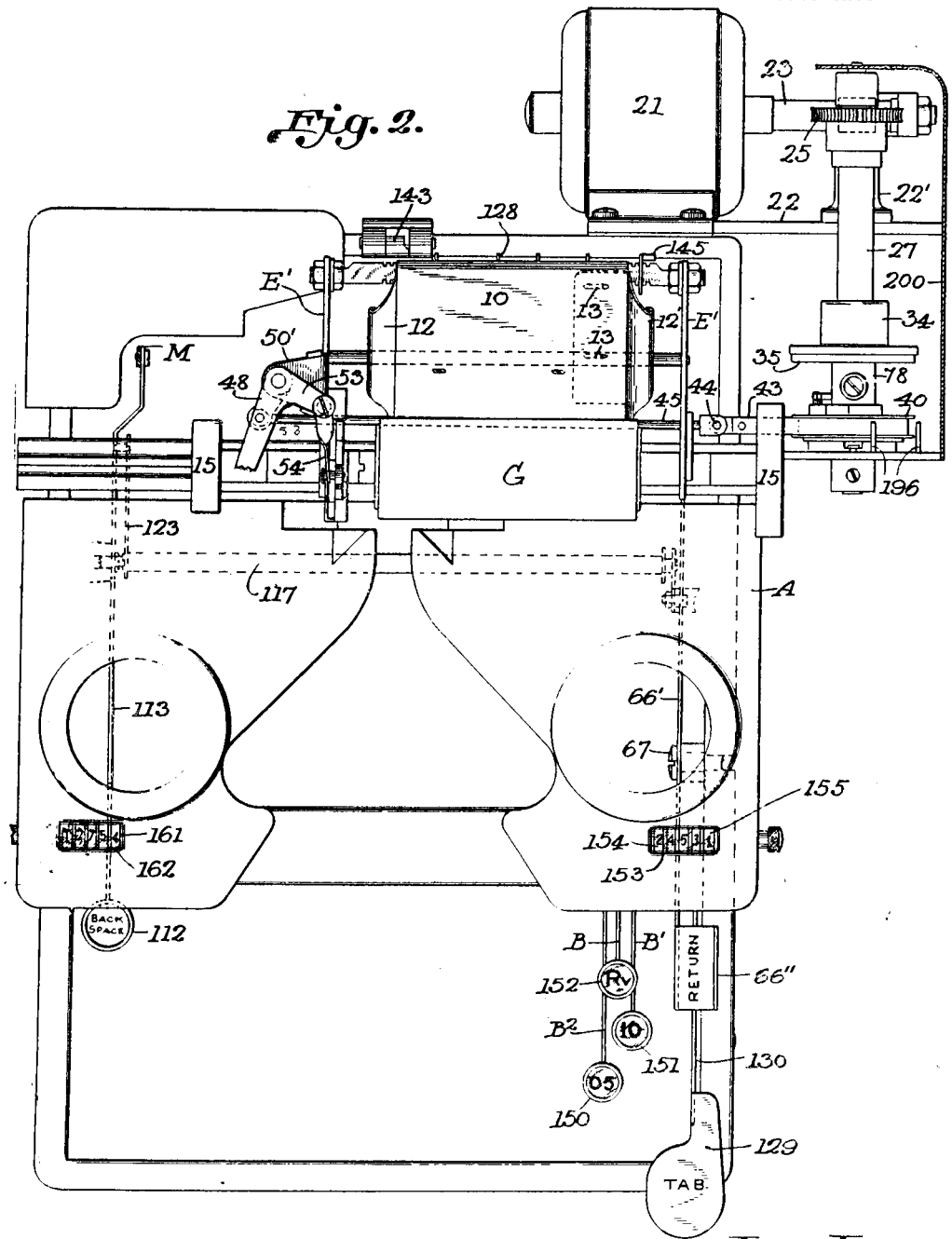

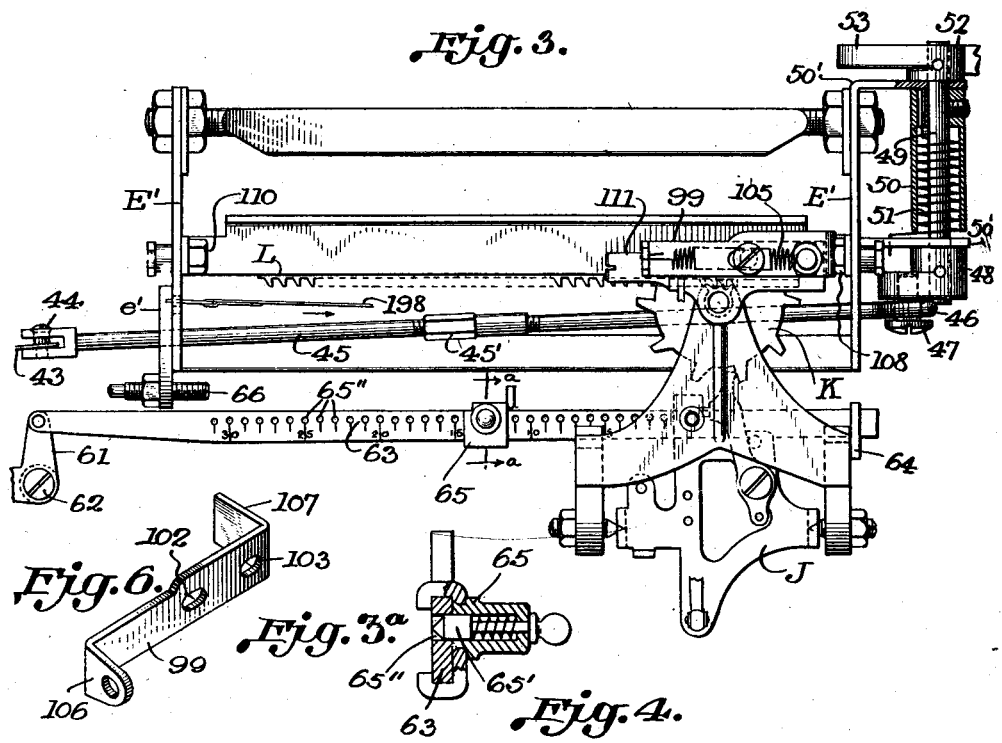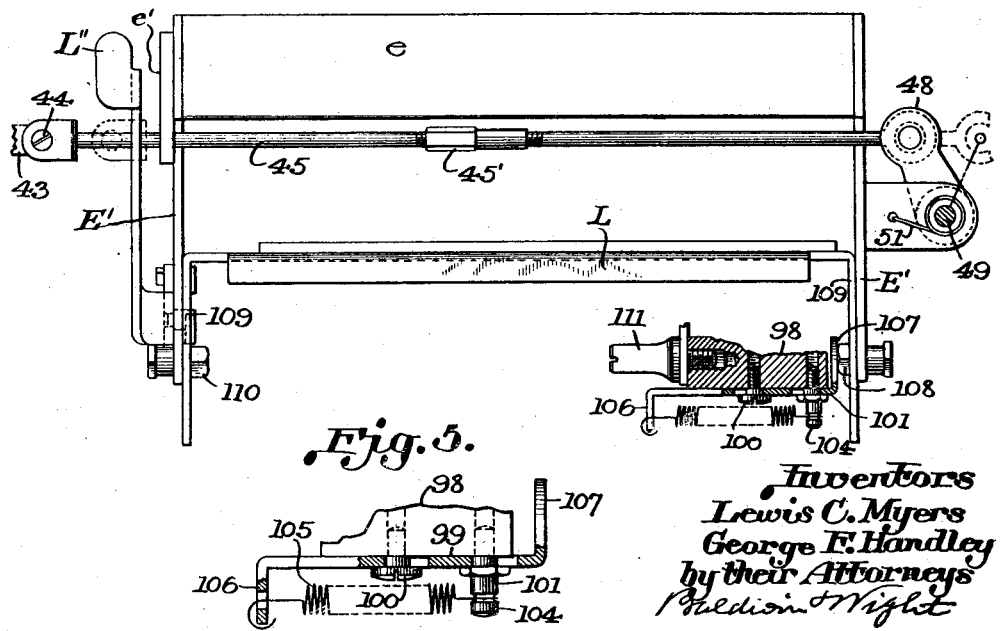

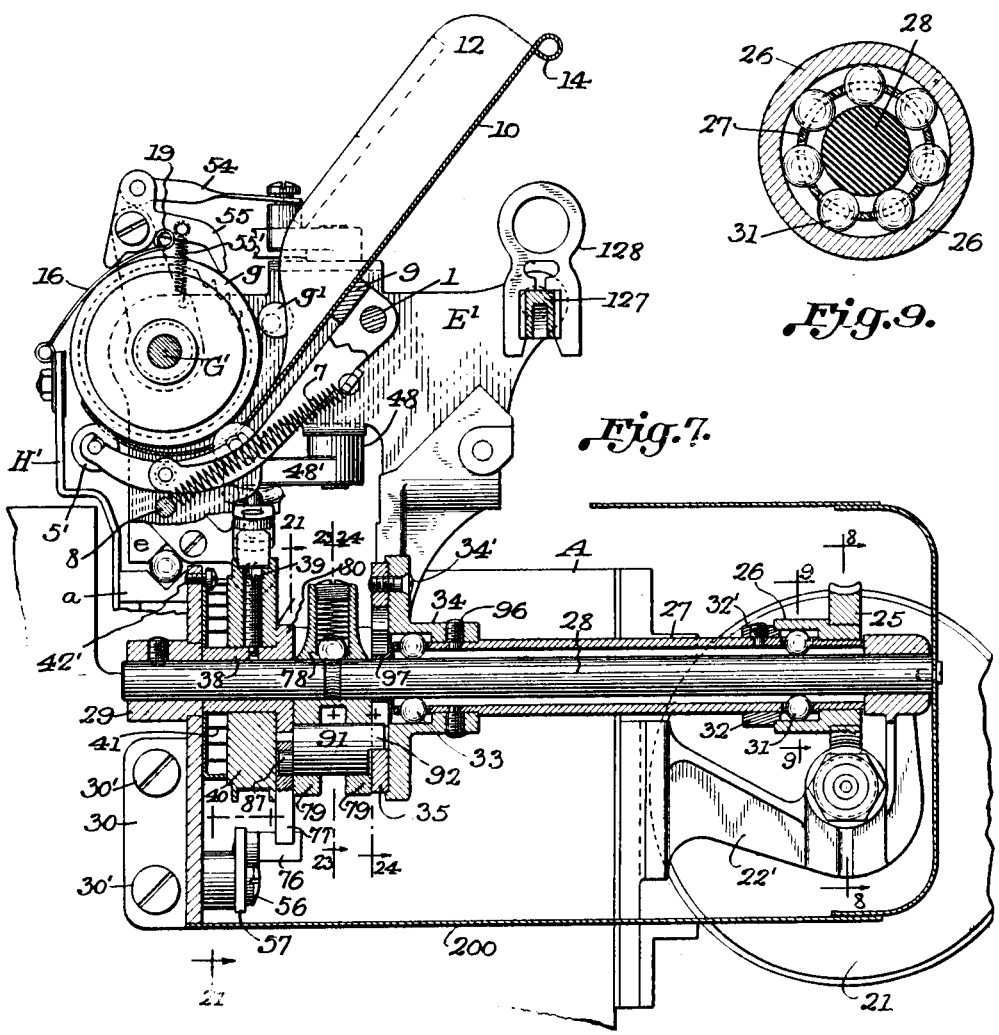
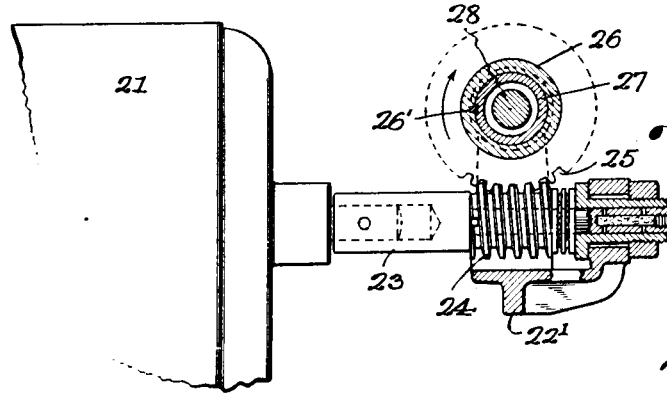

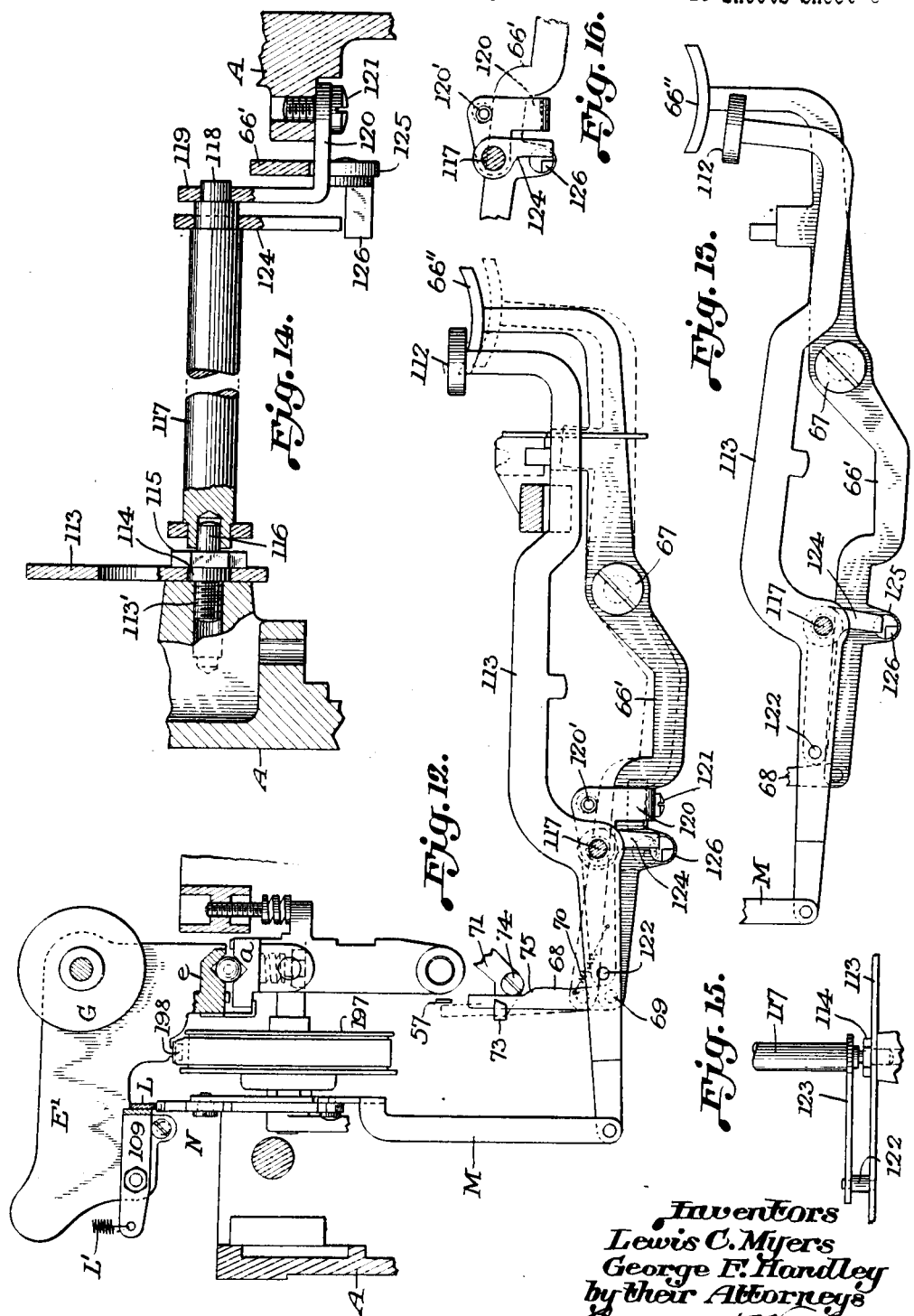

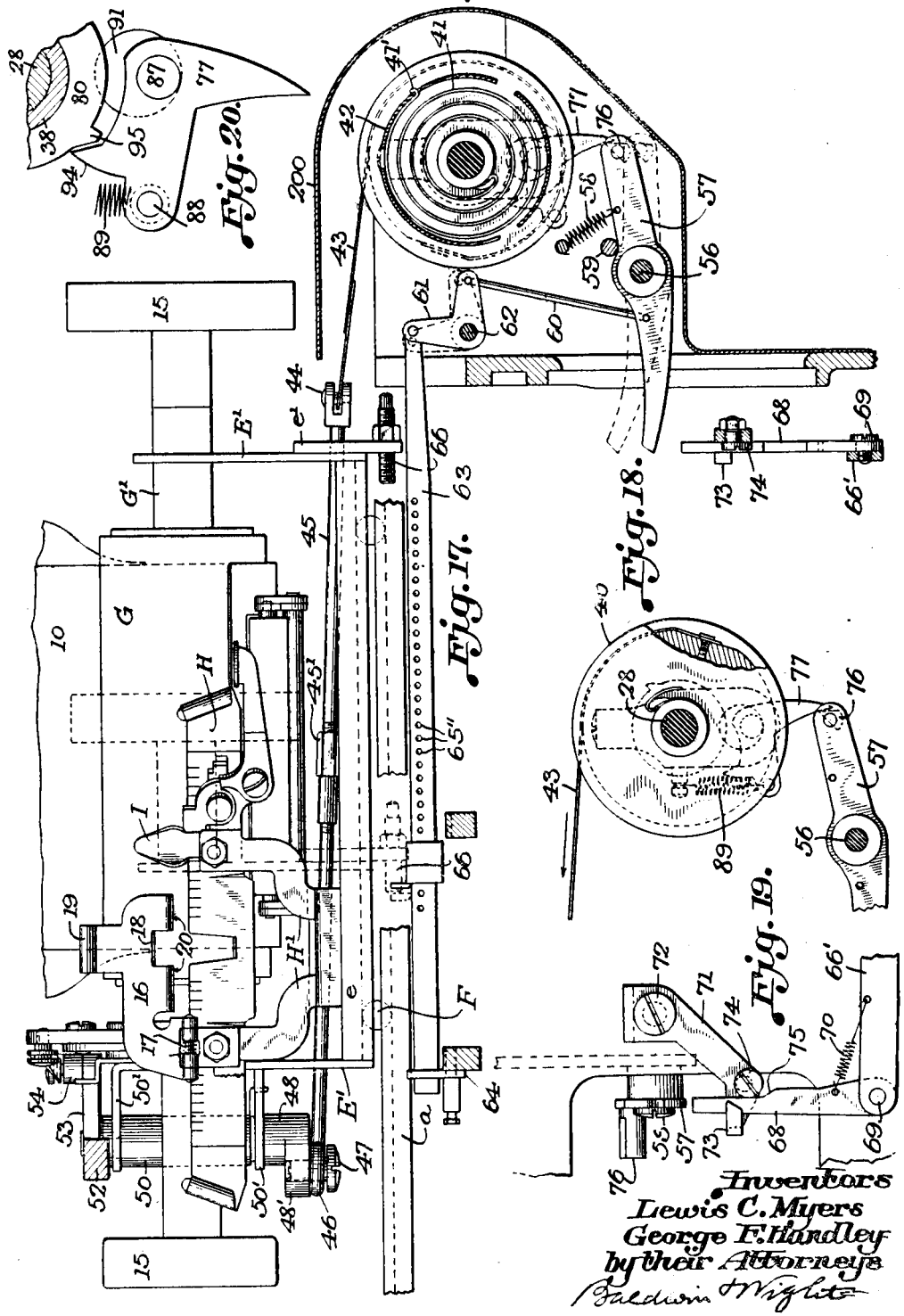

Jan. 27, 1925.  1,524,148
L. C. MYERS ET AL
TYPEWRITING MACHINE
Filed July 12, 1923   10 Sheets-Sheet 8
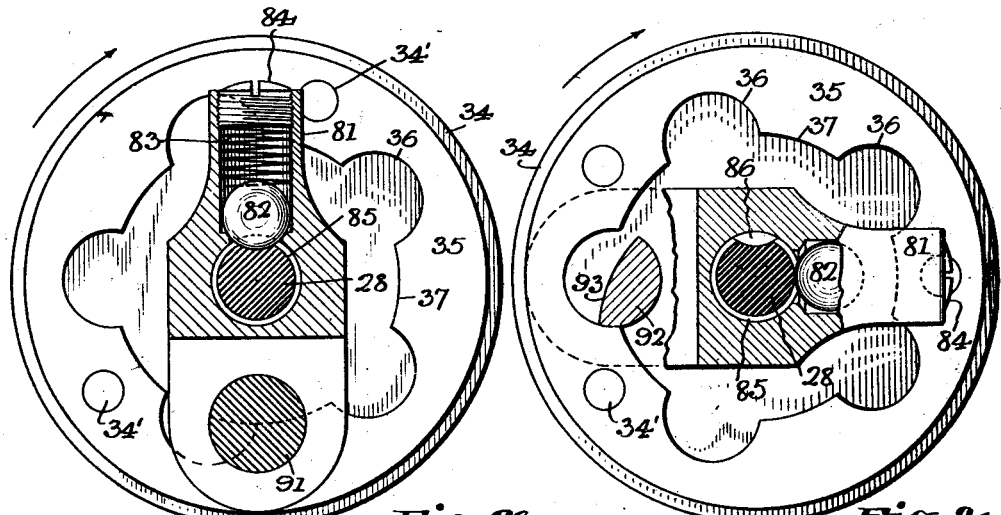
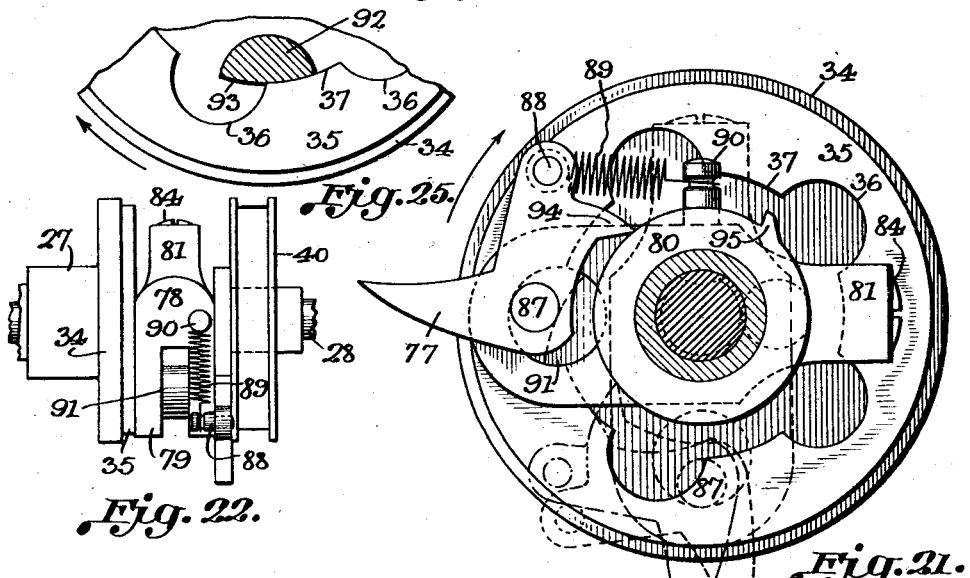
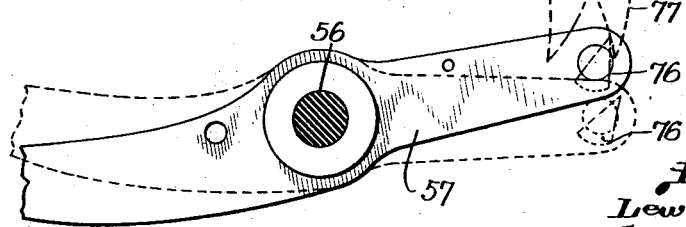
Inventors
Lewis C. Myers
George F. Handley
by their Attorneys

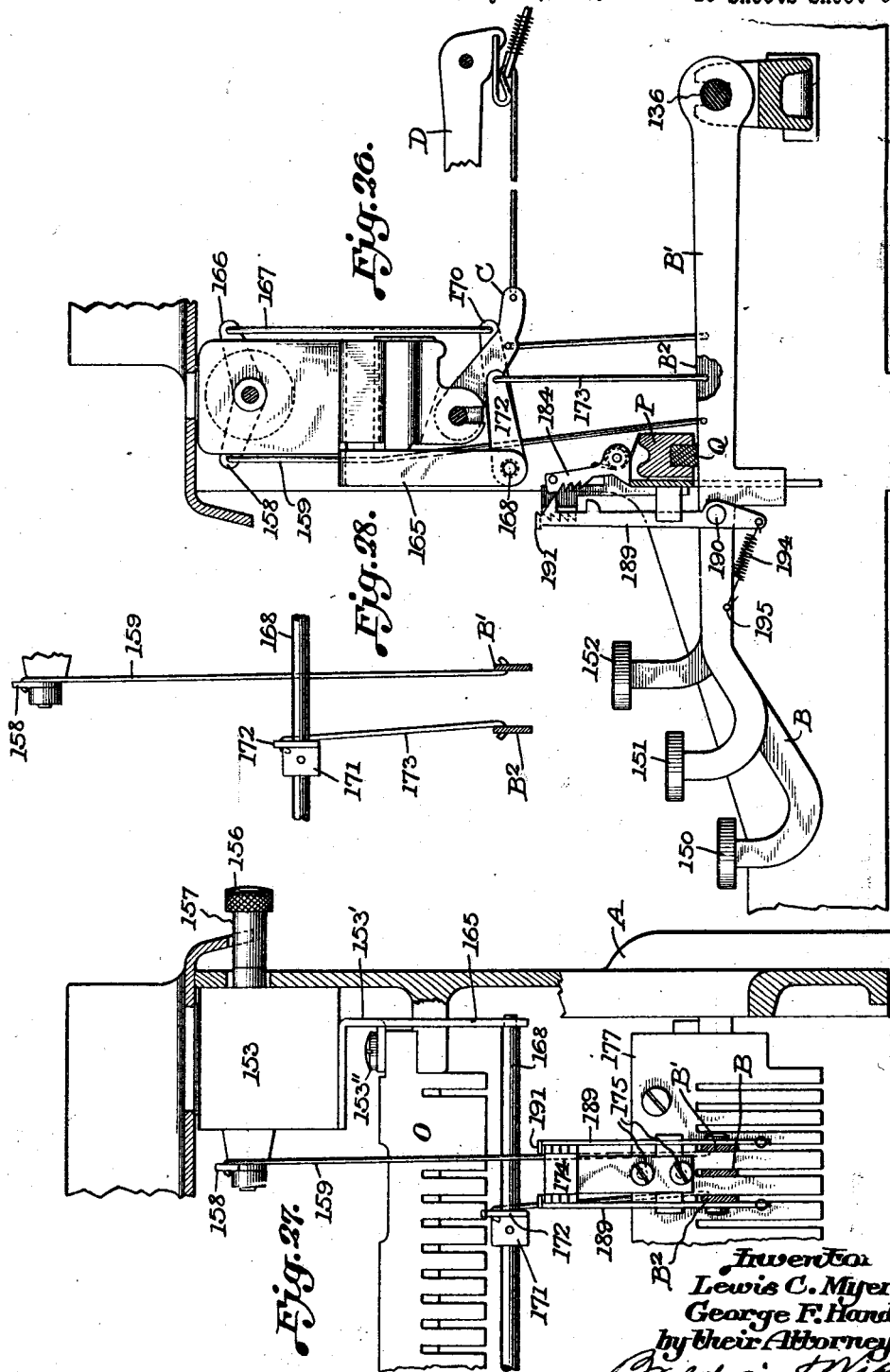

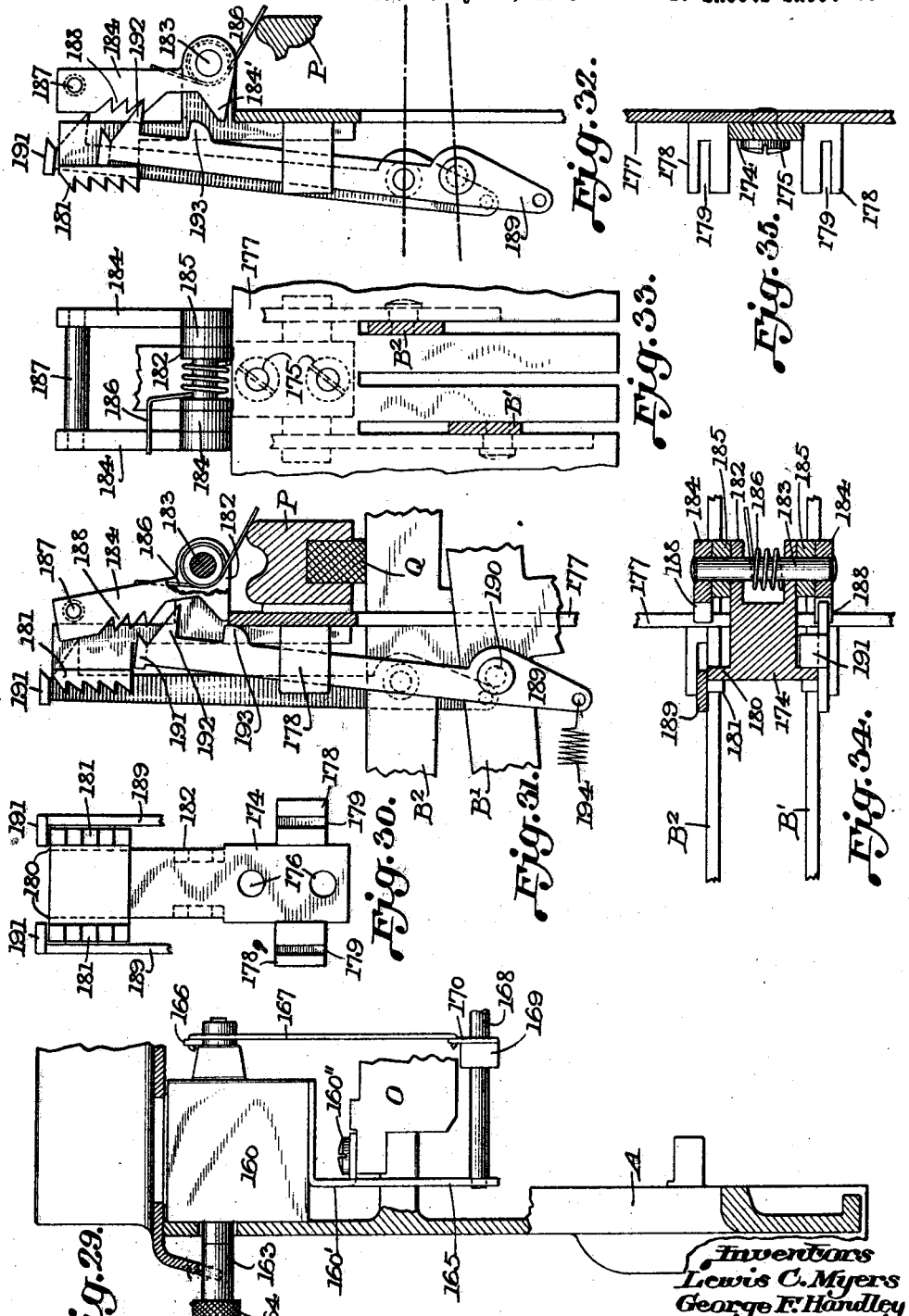

Patented Jan. 27, 1925.

UNITED STATES PATENT OFFICE.

1,524,148

LEWIS C. MYERS, OF FREEPORT, AND GEORGE F. HANDLEY, OF GLENDALE, NEW YORK, ASSIGNORS TO ROYAL TYPEWRITER COMPANY, INC., OF NEW YORK, N. Y., A CORPORATION OF NEW YORK.

TYPEWRITING MACHINE.

Application filed July 12, 1923. Serial No. 651,073.

*To all whom it may concern:*

Be it known that we, LEWIS C. MYERS, a citizen of the United States, and resident of Freeport, in the county of Nassau and State of New York, and GEORGE F. HANDLEY, a citizen of the United States, and resident of Glendale, in the county of Queens and State of New York, have invented certain new and useful Improvements in Typewriting Machines, of which the following is a specification.

The typewriting machine herein illustrated and described as embodying our invention relates particularly to a machine for writing on relatively narrow slips of paper, such for example as itemized telephone bills, although many features of the invention may be used in other types of machines. Such slips frequently have printed thereon indications of dollars and cents at the extreme right hand side of the slip, after writing which the carriage should be returned for the beginning of a new line.

We have, therefore, provided a power driven typewriter carriage return, specifically one driven by an electric motor, which is automatically brought into operation to return the carriage after the last character in the line has been written. There is also provided a special key for returning the carriage from any desired point in the line. The carriage is normally disconnected from the power mechanism so that it may be freely moved in either direction manually. When returned by the power mechanism, the line space mechanism is automatically operated.

The machine containing our invention embodies the usual back space mechanism, and since it is important that the back space key and the carriage return key shall not be depressed at the same time, we have provided an interlocking mechanism whereby the depression of either key prevents the depression of the other until the depressed key has returned fully to normal position.

Tabulating mechanism of a usual type is provided, and a special arrangement is made to prevent the operation of the tabulating mechanism when the carriage is close to the end of a line where the return mechanism is about to be brought into play.

We have provided a carriage return mechanism equipped with clutch mechanism having an element connected to the constantly running power mechanism, an element connected to the typewriter carriage, and an intermediate element normally disconnected from both of the other elements. The intermediate element is connected to the driving element for one revolution of the shaft only, and the connection of the intermediate element to the carriage is made at a varying point depending upon the distance the carriage has moved, but always such that the one complete revolution of the shaft will return the carriage to starting position.

It is desirable in writing telephone bills in which the last item is or may be the amount of the tax on the message, to count the number of times which the keys have been depressed. We have therefore provided a key for writing .10 and another for writing .05, each one connected to a counter. At the end of the day the total amount of tax on all of the bills written may be computed by multiplying the numbers in the counters by five and ten cents respectively and adding the products.

It is obviously necessary that these keys be depressed to their full extent, so that they will operate the counters as well as the type bars connected thereto. Moreover, if a key is depressed a second time before return to normal position, it might enter the amount in the counter twice, while only printing it once. We have, therefore, provided full stroke mechanism for these keys which prevents the return of the keys to normal position after the depression is begun until they have been fully and completely depressed. Moreover, this mechanism is double acting and prevents a second depression of the key before it has returned entirely to normal position.

As in all power driven mechanisms, the carriage is returned with considerable force, and we have, therefore, provided a buffer which absorbs the shock of the return blow and stops the carriage at the same position each time.

Special paper feeding and guiding mechanism has also been provided.

Other features of the invention will be apparent from the following detailed description of the drawings and from the appended claims.

In the drawings:

Figure 1 is a side elevation of the machine with the parts in normal position and some elements omitted.

Figure 2 is a top plan view thereof.

Figure 3 is a rear view showing the escapement mechanism and buffer for the carriage return, together with a part of the line space mechanism in section.

Figure 3a is a section on line a—a of Figure 3.

Figure 4 is a plan view of a portion of the mechanism shown in Figure 3 with the buffer in section.

Figure 5 is a sectional detail view of the buffer mechanism.

Figure 6 is a perspective view of a slide, forming part of the buffer mechanism, removed from the machine.

Figure 7 shows a section through the carriage return mechanism at the right hand side of the machine.

Figure 8 is a section on the line 8—8 of Figure 7.

Figure 9 is a section on the line 9—9 of Figure 7.

Figure 12 is a side view with parts in section showing the relation of the back space and carriage return key levers.

Figure 13 is a similar view showing the back space key depressed.

Figure 14 is a sectional view taken transversely of the machine on the pivotal axis of the back space lever.

Figure 15 is a detail of the mounting of the back space lever.

Figure 16 shows a detail of the interlocking device between the back space and carriage return key levers showing the carriage return lever depressed.

Figure 17 is a front view of the platen with associated parts and a portion of the carriage return mechanism with parts in section.

Figure 18 is a view of the drum for the carriage return tape.

Figure 19 is a detail view of the carriage return operating lever.

Figure 20 is a detail of the clutch mechanism for connecting the power mechanism to the carriage return drum.

Figure 21 shows a section on the line 21—21 of Figure 7, showing the clutch mechanism in different positions in dotted lines.

Figure 22 is a view of a portion of the clutch mechanism.

Figure 23 is a section on the line 23—23 of Figure 7.

Figure 24 is a section on the line 24—24 of Figure 7.

Figure 25 is a fragmental view of the mechanism shown in Figure 24 with the parts in a different position.

Figure 26 is a side elevation of the operating means for the counters and the full stroke mechanism.

Figure 27 is a front view with parts in section of the full stroke mechanism at the right hand side of the machine and the connection from the key lever to the counter.

Figure 28 is a detail view showing the connections from the keys to the counters.

Figure 29 is a view of the counter at the left hand side of the machine with the connection for operating the same.

Figure 30 is a front view of a portion of the full stroke mechanism.

Figure 31 is a side view of the full stroke mechanism with one of the keys fully depressed.

Figure 32 is a similar view at the beginning of the up stroke of the key.

Figure 33 is a rear view of the full stroke mechanism with the levers in section.

Figure 34 is a horizontal section through the full stroke mechanism.

Figure 35 is a section through the guide member shown in Figure 30 when attached to the frame.

Figure 36 is a detail view of the carriage stop mechanism showing the special tabulating stop.

Figure 37 is a side view of the stop and cooperating lever.

Figure 38 is a view showing the type of bill or memorandum for which this machine is especially adapted.

Our invention is illustrated as embodied in a machine which is similar in its main features to the well known Royal typewriter. A main frame A, key levers B, and connections C between the key levers and the type bars D are illustrated as of the usual Royal construction.

A carriage E, comprising side plates E', is mounted to travel on the frame in the usual way and is supported at its front by a track rail e which cooperates with a track rail a on the main frame through interposed ball or similar bearings F. A platen G is carried on a platen axle G' which is supported at its ends in the side plates E' of the carriage.

In the present embodiment of the invention the carriage is not mounted for case shifting since only capital letters are provided, but the invention is not limited thereto, since the usual case shifting mechanism of the Royal machine or other machines can be employed without any change in the features comprising our invention. There is also illustrated a short carriage and platen, especially adapted to the writing of narrow bills or memoranda, but the invention is entirely independent of the length of the carriage.

The usual paper scale H and fingers I may be employed and the scale is supported by fingers H' carried by the frame of the machine. One of the fingers I is usually omitted or moved to inoperative position to permit the use of a special finger hereinafter described.

Mounted in the escapement frame is an escapement rocker J which carries dogs that cooperate with an escapement wheel K which is operatively connected in any desired manner to a rack L pivotally mounted in the side plates E' of the carriage and movable by the ordinary release key L'' or by the tabulating key, whenever it is desired to release the carriage from the control of the escapement mechanism. Springs L' (Fig. 11) are provided to return the rack to normal position.

Figure 10:
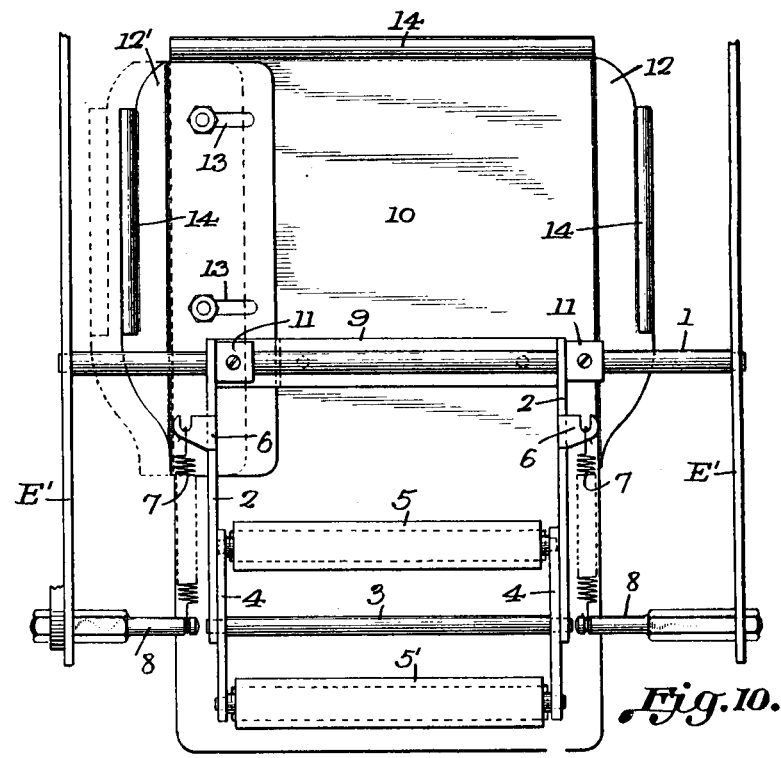
Figure 10 is a bottom plan view of the paper table and paper feed rolls removed from the machine.
Figure 11:
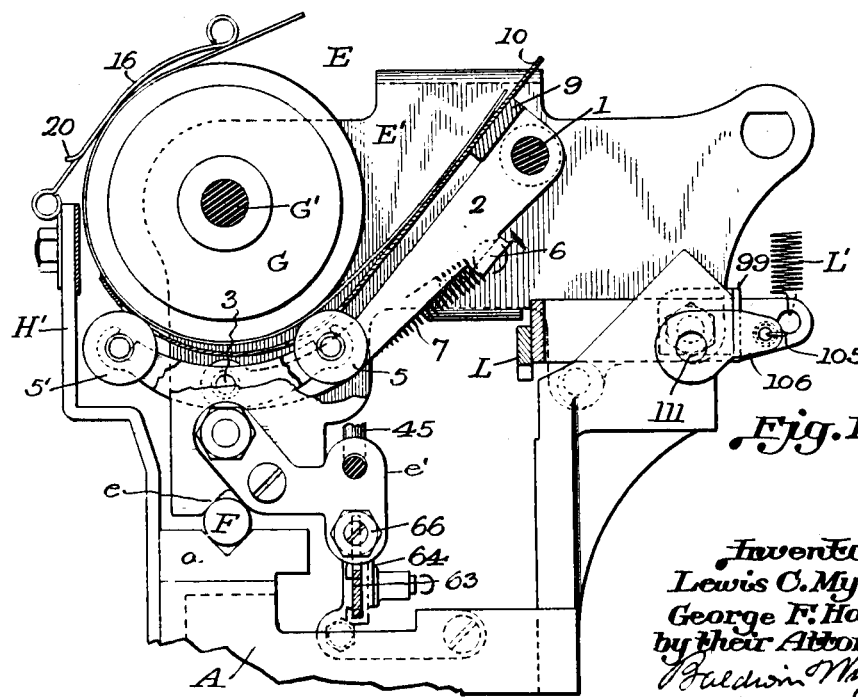
Figure 11 is a side view with parts in section showing the paper table and paper feed rolls in operative position.

As clearly shown in Figures 7, 10 and 11, a rod 1 extends between the side plates E' of the carriage and has mounted thereon arms 2 which carry a short shaft 3 in their ends. Arms 4 are carried on the shaft 3 inside of the arms 2 and support at their ends rear and front feed rolls 5 and 5'. The shafts of these rolls are preferably mounted in open bearings in the ends of the arms 4 as shown in Figure 11. Each arm 2 is provided with an outwardly extending ear 6 to each of which is hooked one end of a spring 7 the other end of which is fastened to a pin 8 supported in the side plates E' of the carriage. These springs tend to hold the feed rolls against the platen G.

A flat bar 9, which is preferably integral with the arms 2, overlies the rod 1 and supports a paper table 10. Collars 11 integral with arms 2 are provided with set screws for positioning and securing the arms to the pivotal rod 1. The paper table 10 extends beneath the platen and has cut outs through which the paper feed rolls 5 and 5' pass to contact with the platen. Its upper portion has a relatively high side portion 12 fixed thereto and a right hand side portion 12' similar in shape but adjustably mounted on the main portion by means of bolt and slot connections 13, which permit the adjustment of this side to the dotted line position in Figure 10. By the use of these relatively high side portions a deep chute is formed, the width of which may be adjusted so that the bills will fit snugly in the bottom thereof. Successive bills may therefore be introduced and the writing in the right hand column will always fall in the proper position. The table 10 and sides 12 and 12' have rolled edges 14 to improve the appearance and facilitate the introduction of the bills into the machine.

To hold the bills snugly in the bottom of the chute one of the usual paper fingers I is either omitted or turned to inoperative position and a special finger provided. This comprises a member 16 (Figure 17) which is pivotally connected to one of the arms H' and is spring pressed against the platen. It extends over the printing point adjacent to the finger I and has a cut out 18 lying above the printing point. An upper extension has a rolled end 19, and the lower edges 20 are outturned in order that they may not catch on the bills when introduced into the machine.

We have embodied in our machine a power driven carriage return which in the form illustrated is driven by an electric motor 21 mounted in a bracket 22 attached to the rear of the machine frame A and including a bracket arm 22'. The shaft 23 of the motor is provided at its outer end with a worm 24 which meshes with a worm gear 25 carried by a bushing 26 which is splined at 26' to a hollow shaft 27 mounted to rotate about a fixed shaft 28. The end of the shaft 23 as well as one end of the fixed shaft 28, is mounted in the bracket arm 22', while the other end of the shaft 28 is fast in a hub 29 of a bracket 30 attached to the side of the machine frame A by screws 30' or in any suitable manner. Near each end the hollow shaft 27 is provided with a plurality of openings in which are mounted balls 31 and 33. The balls 31 are interposed between the bushing 26 and the fixed shaft 28, and the parts are held in proper relation by a collar 32 fastened to the hollow shaft 27 by screws 32'. The balls 33 lie between the shaft 28 and a collar 34 attached to the hollow shaft, which collar is fastened by screws 34' to a member 35 of a clutch mechanism. The openings in the hollow shaft 27 serve as cages for the balls 31 and 33 and the shaft 27 therefore rotates freely on the shaft 28. When the machine is in use, the motor is constantly running, and therefore the shaft 27 and the clutch member 35 are both rotating.

As shown in Figures 21, 23 and 24, the clutch member 35 has an irregular central opening comprising a plurality of semi-circular parts 36 connected by arcs 37 which are struck from the center of the shaft 28. The function of this member will be hereinafter described.

A sleeve 38 is mounted to revolve freely on the fixed shaft 28, and fastened by a screw 39 to the sleeve 38 is a drum 40. A spring 41 is attached at one end to the sleeve 38 and at its other end at 41' to a shell member 42 which is attached by a screw 42' to the fixed bracket 30. A tape 43 is wound upon the drum 40, and the spring 41, which is a relatively light spring, tends to keep the tape taut and wind it up whenever the carriage is returned by hand.

It also tends to prevent the tape from flying off the drum in the quick return and stop of the carriage when the power return is employed.

The tape 43 is pivotally connected at 44 to a sliding rod 45 provided with a turnbuckle 45'. This rod slides through an opening in one carriage side plate E' and through a bracket e' fastened to the other side plate, and terminates at its free end in an eye 46 which is loosely attached by a screw 47 to an arm 48' on a collar 48 rigidly fastened to a vertical shaft 49 surrounded by a sleeve 50. This shaft 49 extends through bent off ears 50' of one of the carriage side plates and the sleeve 50 is attached to said shaft. A spring 51 attached at one end to turn with the shaft through the medium of the sleeve is attached at its other end to one of the ears 50' and tends to return the shaft to normal position. At its upper end the shaft has rigidly fastened thereto a collar 52, and since the collars 48 and 52 fit outside the ears 50', the shaft is held in operative position. The collar 52 is provided with an arm 53 which is connected by a link 54 with a line space pawl 55. This pawl and the cooperating mechanism are, or may be, substantially similar to the Royal line space mechanism. The pawl normally rests on an adjustable guard and when operated is drawn by a spring 55' into engagement with the teeth g of a ratchet wheel carried by the platen axle or platen. An adjustable eccentric stop g' limits the throw of the pawl. It is obvious that when the drum 40 is rotated to wind up the tape 43 thereon, the carriage will be returned to starting position, and simultaneously the line space mechanism will be rotated to space the work sheet the desired distance. The platen may be rotated at any time by relatively large finger wheels 15 attached to the ends of the platen shaft which permit the quick movement of the work sheet to writing position when it is introduced into the machine.

Mounted on a headed screw 56 in the bracket 30 is a lever 57, the outer end of which is normally in engagement with certain trip mechanism hereinafter described. The operation of this lever results in connecting the power return mechanism to the drum 40 and thereby returns the carriage. The lever may be operated automatically at a predetermined point or it may be operated manually by a key in the keyboard to return the carriage whenever desired.

The lever 57 may be operated automatically through a train of connections comprising a link 60 connecting the lever 57 with one arm of a bell crank lever 61 pivoted at 62 to the bracket 30 and having its other arm pivoted to a sliding bar 63 which slides in a guide 64 mounted on the frame. The sliding bar has mounted thereon an adjustable stop 65 such as shown in Figure 3ª. The body of the stop partially embraces the bar 63 and is provided with a spring pressed, hand operated plunger 65' which is adapted to engage any one of a plurality of holes 65'' in the bar 63. The stop also has an upturned portion which is adapted to cooperate with an adjustable stop 66 mounted in the bracket e' on the carriage frame as the carriage is moved from right to left during the printing operation. When the parts are moved from the full to dotted line position of Figure 17, the lever 57 will be rocked as shown.

As illustrated, both the stops 65 and 66 are shown as adjustable, but in practice, probably only one will ordinarily be made adjustable. The screw stop 66 may be made of any desired length and the stop 65 may be fixed, whereby adjustment of the movement of the carriage will be obtained by adjustment of the stop 66, which serves as a limiting stop for the carriage. On the other hand, if the adjustable stop 65 is employed, the stop 66 will be short and capable of slight adjustment only. The particular form employed will be determined by the character of work which it is desired to perform.

The lever 57 is operated manually through a return key lever 66' provided with a key 66'' and pivoted at 67. To the rear end of this lever is pivoted at 69 an upstanding finger 68 and a spring 70 attached to the lever 66' and the finger 68 normally holds the latter in its forward position. A bracket 71 (Figure 19) is fastened to the frame of the machine by a screw 72 and extends downwardly and then rearwardly, terminating in a hooked end 73. An eccentrically adjustable screw stop 74 is located just in front of the hooked end 73 and the finger 68 is guided for movement between the end 73 and the stop. The finger 68 is provided with a shoulder 75 on the side which contacts with the stop.

A depression of the return key 66'' will therefore result in rocking the lever 66' about its pivot 67 and in raising the finger 68 upwardly into contact with the lever 57. As soon as the lever 57 has been rocked sufficiently to disengage the trip mechanism, the shoulder 75 will come into contact with the stop 74 and the finger 68 will then be cammed rearwardly to the position shown by dotted lines in Figure 12, at which time it will be out of contact with the lever 57, which will be immediately returned to normal position. This prevents any double operation of the carriage return mechanism upon a single depression of the key lever, and also avoids the necessity of a prompt release of the return key, since the return mechanism will perform its usual operation and will return to normal position even if the key is held depressed.

The opposite end of the lever 57 is provided with a rearwardly projecting pin 76 which has a generally triangular shape and an upper sharp edge normally in engagement with a trip 77.

It is apparent that the carriage return drum 40 is free to be turned on the shaft 28 and that when the machine is in operation, the hollow shaft 27 and clutch member 35 are constantly rotating. The movement of the lever 57 out of engagement with the trip 77 is adapted to bring into engagement clutch mechanism which will clutch the carriage return drum 40 to the rotating clutch member 35 throughout a sufficient period to return the carriage to starting position. This result is attained through the mechanism now to be described.

An intermediate clutch member 78 is mounted on the shaft 28 between the clutch member 35 and a flange 80 of the sleeve 38. This clutch member is mounted for free rotation and it normally holds in engagement the trip 77 with the lever 57. One side of the clutch member 78 is divided to form two fingers 79. The other side is a generally cylindrical extension 81, which is hollow and in which is mounted a ball 82 normally spring pressed by a spring 83 held in place by a screw cap 84. The shaft 28 has a groove 85 surrounding the same, in which the ball 82 may travel, and a cut out portion 86 in which the ball is pressed by the spring 83 when the parts are in normal position.

The trip member 77 is fast with a pin 87 with which it may turn, and at a point removed therefrom it has a pin 88 to which is attached one end of a spring 89, the other end of which is fastened to a pin 90 on the clutch member 78. When the parts are in normal position the spring is held under tension by the engagement of the trip member 77 with the pin 76 on the lever 57, since the clutch member 78 has turned on the shaft far enough to bring the ball 82 into the depression 86, and the parts are so proportioned that this operation holds under tension the spring 89.

The pin 87 is integral or rigid with a member 91 which is mounted to rotate in the ears 79 of the clutch member 78. It, therefore, follows that the trip 77 and member 91 will rotate about the axis of the latter a short distance under the influence of the spring 89 when the trip is released. The body of the member 91 is cylindrical, but the end 92 opposite to the trip 77 is cut to the form clearly shown in Figures 24 and 25.

One side 93 is cut on an arc struck from the center of the shaft 28 as a center, and when the trip 77 is in normal inoperative position the end 92 which extends into the open portion of the clutch member 35 will have the position shown in Figure 25 in which the relation of the faces 93 and 37 permit the clutch member 35 to rotate freely without imparting any movement to the member 92 or through it to the member 78. However, whenever the trip 77 is released, either by the manual or automatic operation of the lever 57, the spring 89 will turn the trip and the member 91 slightly, bringing the end 92 into the position shown in Figure 24, wherein it will engage the walls of the first cut out 36 which meets it, and the rotating clutch member 35 will thereby communicate rotary movement to the member 91 and consequently to the whole clutch member 78.

The trip 77 is also provided with a projection 94 which is adapted to engage a lug 95 on the flange 80 of the sleeve 38 which carries the return drum 40. When the trip is in normal position, it will not engage the lug 95, but as soon as the trip is released from the lever 57 and moves under the influence of the spring 89 it passes to a position in which the projection 94 will engage the lug 95, and as soon as such engagement takes place the rotation of the clutch member 78, produced as explained above, will be communicated to the carriage drum 40 and act to wind up the tape 43 and thereby return the carriage. The engagement of the point of the projection 94 with the edge of the flange 80 serves to limit the movement of the trip under the influence of the spring 89.

The position of the lug 95 with relation to the normal rest position of the clutch member 78 and 77 depends upon the amount of movement of the carriage from its starting position. If the carriage has moved substantially the full length of a line, the projection 94 will engage the lug 95 almost immediately, but if the carriage has moved only a short distance, the clutch member will rotate the greater part of one complete revolution before such engagement takes place. The parts are so proportioned that one complete revolution of the clutch member 78 will serve to return the carriage to normal position regardless of the distance which it may have moved from the starting position.

It is to be noted that as soon as the clutch member 78 completes one complete revolution, or just before that moment, the tail of the trip 77 will come into contact with the pin 76 on the lever 57 which has returned to normal position in the meantime whether the return key has been released or not, as set forth above. This contact will rotate the trip 77 slightly on its axis, moving the projection 94 out of position to engage the lug 95 and also moving the end 92 of the pin 91 from the position shown in Figure 24 to that of Figure 25, thus permitting further rotation of the clutch member 35 without any movement of the member 78. The contacting portions of the trip 77 and the pin 76 are so formed, as illustrated, that the contact will be practically a line contact, thus allowing quick disengagement and re-engagement with a minimum of wear and no danger of breakage.

The flange 34 is attached to the shaft 27 by screws 96, and these screws as well as the screws 32', when removed, leave openings through which lubricant can be introduced within the hollow shaft in proximity to the balls 31 and 33. An annular member 97 assists in retaining the lubricant within the hollow shaft at the end adjacent the balls 33.

Since the carriage is returned by power, it moves very quickly and will strike the limiting stop with considerable force. In order to absorb the shock of the blow, we have provided buffer mechanism as shown in Figures 4, 5, and 6. A slide plate 99 is mounted on a portion 98 of the escapement bracket and is held in position by a headed screw 100 and a screw 101 having a hexagon shoulder thereon, which pass through elongated holes 102 and 103 respectively and screw into the bracket 98. The screw 101 is extended to form a post 104 to which is attached one end of a spring 105, the other end of which is attached to the bent end 106 of the slide 99. The other end of the slide is bent in the other direction to form a contact member 107. The parts are normally in the position shown in Figure 5, but when the carriage is returned a stop 108 in the side frame E' of the carriage comes against the member 107 and moves the slide 99 to the position shown in Figure 4, thus tensioning the spring 105. This cushions the return movement. A stop 110 similar to the member 108 contacts with the stop 111 carried by the escapement bracket to limit the movement of the carriage in letter space direction. The stops 108 and 110 are in the form of nuts on screw bolts which pass through the side frames E' of the carriage and also through the side members 109 which support the carriage rack, and they serve as pivots for the movement of the rack when rocked to release the carriage from control of the escapement mechanism.

In order to move the carriage backward step-by-step there is provided a back space key 112 which operates a back space lever 113 that turns on a shoulder 114 of a screw 113' which engages the side of the machine frame. A hexagon shoulder 115 holds the lever in place but permits its free operation. Preferably integral with the screw 113' is a pin 116 which affords a pivot bearing for one end of a shaft 117 which extends across the machine and has its opposite end 118 pivotally mounted in a bracket 119 having a horizontal portion 120 that is fastened to the side of the machine by a screw 121. To the rear end of the back space lever 113 is pivoted a link M which operates back space mechanism N not shown in detail, but which may be of any desired type such as shown in Patent No. 1,154,277, Utz, September 21, 1915.

Somewhat in the rear of the pivot 114 the back space lever has a pin 122 with which engages closely a short arm 123 which has its other end fast to the rock shaft 117. A depression of the back space lever will therefore rock the shaft 117. At the right hand side of the machine the rock shaft 117 is provided with a depending finger 124. The key lever 66' which operates the carriage return mechanism, is provided with a lug 125 from which extends a pin 126 that is quadrant shaped. As shown in Figure 12, in which the parts are in normal position, the lower end of the finger 124 and the pin 126 have a corner to corner relation but are slightly out of contact. When the back space key is depressed as shown in Figure 13, the finger 124 swings to a position in which it directly overlies the horizontal face of the quadrant shaped pin, and the carriage return key lever can not be depressed since the pin 126 cannot move upwardly as if necessary when this lever is depressed. On the other hand, if the carriage return lever 66' is depressed, as shown in Figure 16, the pin 126 is swung up to a position in which the vertical face thereof lies just in the rear of the finger 124, and the back space key cannot be depressed, since this finger cannot move rearwardly as is necessary at such times. This mechanism therefore operates to prevent the accidental depression of either the back space lever or the carriage return lever unless the other one of these two levers is in normal position. Some mechanism of this character is necessary since a simultaneous depression of the two levers might result in severe damage to the machine.

A tabulating stop bar 127 is mounted in the side frames of the carriage in the usual manner and is provided with tabulating stops 128. A key 129 which is preferably broad enough to be operated by the palm of the hand, is located near the front of the keyboard, and connected thereto is a key lever 130 pivoted at 67 which has an upwardly extending arm 131 connected by a link 133 to an offset 134 on a vertical lever 135 pivoted at 136 and connected by a link 137 to a lever 138 in the rear of the machine. This lever is pivoted at 139 and has an upwardly extending arm 140 which bears against and operates a stop lever 141 pivoted at 142 and having an offset upper end 143 as shown in Figure 36. The stop 144 which is placed at the right hand side of the carriage has an extension 145 against which the offset end 143 comes, thus preventing the key from being operated in this position sufficiently to release the carriage. There is shown at 146 a fragment of a releasing lever which is operated by the tabulating lever 138 as shown in Patent No. 1,277,719, Handley, September 3, 1918. Cooperating stops 147 and 148 limit the movement of the tabulating key lever. The tabulating mechanism may be of any desired type, so long as provision is made for preventing the operation thereof after the carriage has entered the zone in which the automatic return mechanism becomes effective.

Keys 150, 151 and 152 are provided in the keyboard, the key 150 being carried by a key lever B² and designed to write 5¢, the key 151 being carried by a lever B' and designed to write 10¢, while the key 152 is typical of the remaining keys and is connected to a key lever B. It is employed to write a code sign on the hill. The keys 150 and 151 in addition to operating their respective type also operate counters which register how many times each key has been depressed. These counters may be of any old or desired type. A counter 153 is supported by a bracket 153' which has an ear connected by a screw 153" to the comb plate O, and the numerals 154 may be read through an opening 155 in the top plate. A finger piece 156 on the shaft 157 of the counter 153 is used for resetting the same, and this shaft has an arm 158 connected by a link 159 to the key lever B'.

At the left hand side of the machine a counter 160 is supported by a bracket 160' which has an ear connected by a screw 160" to the comb plate O, and the numerals 161 may be read through an opening 162 in the top plate. A finger piece 164 on the shaft 163 of this counter is used to reset the same, and the shaft has fastened to it an arm 166 to which is attached a link 167. The brackets 153' and 160' each have depending arms 165 in which is mounted a shaft 168 which extends across the machine. The link 167 is connected to an arm 170 carried by a collar 169 on this shaft. Near the right hand side of the machine is provided on the shaft 168 a collar 171 having an arm 172 which is connected by a link 173 to the key lever B². It is, therefore, evident that whenever one of the keys 150 or 151 is depressed, the appropriate numeral will be printed and simultaneously the counter will be operated, so that the number of depressions of each key is registered. These keys are employed in our machine for writing the amount of tax, and it is evident that the total amount of tax on all of the bills written during the day can be quickly ascertained by multiplying the number in the counter 153 by 10¢, the number in the counter 160 by 5¢, and adding the two products. The two counters may then be reset to zero for the next day's work.

Since the levers B' and B² not only operate the type action to print but also operate the counting mechanism, it is very important that the levers be depressed to their full extent, and also that they may not be depressed a second time before they have fully returned to normal position. We have, therefore, provided simple but efficient full stroke mechanism which will attain this result. A bracket member 174 of the form clearly shown in Figure 30 is attached by screws 175 which pass through holes 176 therein to the front comb plate 177. This bracket has two ears 178 near its lower end which are provided with slots 179. Near the top two ears 180 are provided with teeth 181 which face the front and project downwardly. About in its middle portion, the bracket has rearwardly extending ears 182 in which is mounted a pivot pin 183 on which turns a frame comprising side arms 184 which are spaced by collars 185 from the ears 182. A spring 186 coiled around the pin 183 may bear at one end against a side arm 184 and at the other against a frame member P which is provided with the buffer, Q, for the return movement of the key levers. The arms 184 are connected at their upper ends by a cross bar or rod 187 and each arm has teeth 188 on its front edge which extend upwardly.

To each key lever is pivoted a lever 189 on a pivot 190. These levers extend upwardly and are guided in the slots 179 of the bracket 174. At the uper end each lever 189 has a tooth 191 that is bent inward at an angle to the plane of the lever and is in a position to cooperate with the adjacent ratchet teeth 181. Near the upper end each lever 189 also has a tooth 192 extending rearwardly in the plane of the lever and cooperating when the key is depressed with the teeth 188 on the bar 184. Each lever 189 also has a lug 193 somewhat below its upper end which contacts with the comb guide 177 to limit the rearward movement of the lever. At the lower end of the lever is connected a spring 194 which extends forwardly and is attached to the key lever at 195.

When the key B' for example is depressed, the tooth 191 passes down in front of the teeth 181 and is held in contact with them by the spring 194 which rocks the lever 189 on its pivot 190. The key lever cannot, therefore, move upward on account of the engagement of the tooth 191 with the teeth 181. As soon as the lever has been fully depressed, the tooth 191 passes beneath the lowermost tooth 181 and springs rearwardly into the position of Figure 31 in which the key lever is fully depressed. As soon as the upward movement begins, the tooth 192 passes over the teeth 188, and after it has passed one of these teeth as shown in Figure 32, it cannot be depressed until it has moved all of the way up to normal position. The forward movement of the arms 184 is limited by the engagement of the heel portion 184' with the comb plate, but during the upward movement of the lever 189, the frame formed of the side arms 184 will be cammed rearwardly against the tension of the spring 186 as shown in Figure 32. When the key lever returns to normal position the tooth 192 engages the upper portion of the side arms 184 and is moved to normal position as in Figure 26. This full stroke mechanism, therefore, prevents the return of a depressed key to normal position before it has been fully depressed and also prevents a second depression of the key before it has returned entirely to normal position.

Pins 196 are attached to the bracket member 30 and extend over the edge of the carriage return drum to keep the tape 43 from flying off of the drum. The carriage is advanced in letter space direction as usual by a spring drum 197 connected by a tape 198 to the carriage.

A typical memorandum or bill 199 is shown in Figure 38. It contains columns for date, number of messages, place, amount, a code letter, and the amount of tax, either the 5¢ or 10¢ being written by a single depression of a key. Obviously the data may be arranged differently, since it is only necessary that the carriage be moved upon the depression of the last key to a position wherein the return mechanism becomes automatically operative.

A cover 200 of any suitable shape fits over and encloses the carriage return mechanism as shown.

While the invention has been illustrated in connection with a non-shifting platen, it is obvious that it may be used in connection with a platen that shifts for case printing, since the pivoted connection of the tape 43 to the sliding rod 45 will permit of a shifting movement of the platen without any effect upon the remainder of the mechanism. Moreover, it is evident that the invention is not limited to an electric return as any other means might be employed for driving the hollow shaft 27.

We have thus provided useful and efficient mechanism by which the writing of bills may be greatly facilitated. The paper chute is first set by adjustment of the side member 12' to the exact width of the bill to be written and the bill when dropped therein can be quickly brought to the printing line by means of the large platen knobs 15 which enable the platen to be rotated through comparatively large distances very quickly. The line is written in the usual manner, and with the writing of the tax, which is performed by a single key, or with the writing of any other symbol which may be placed in the right hand column, the carriage is returned to position for beginning the next line and the line space mechanism automatically operated. This return movement takes place very quickly and there need be practically no interruption to the work of the operator.

When the tax is written, the depression of the key is registered in the counting device, and when the bill is finished it may be quickly removed and another inserted in the machine. The full stroke mechanism imposes no additional labor upon the key and prevents any erroneous operation of the counter. The interlock mechanism between the carriage return key and the back space key, prevents any operation of the two keys at the same time and thus avoids damage to the machine. The special tabulating stop also prevents operation of the tabulating mechanism at a time when the return mechanism is about to operate automatically. Owing to the particular form of clutch mechanism employed, there is normally no connection between the carriage and the return mechanism, and the carriage can be returned by hand from any position, or may be released and moved manually in either direction as desired.

The return mechanism, and many other of the features of our invention are not in any way limited to typewriting machines, but will be useful in combined typewriting and adding machines, also in adding machines or similar devices. Also various changes may be made in the details of the invention and their specific embodiments without departing from the spirit thereof.

In general, it is understood that the invention is limited only by the scope of the appended claims.

We claim as our invention:

1. In a typewriting or similar machine, a carriage return mechanism comprising a constantly rotating shaft, a spring drum connected to the carriage and an intermediate mechanism normally disconnected from the drum and the shaft, but adapted to be connected to both to return the carriage.

2. In a typewriting or similar machine, a carriage return mechanism comprising a constantly rotating shaft, a spring drum connected to the carriage, and intermediate single revolution mechanism normally disconnected from the drum and the shaft, but adapted to be connected to both to return the carriage from any point by one complete revolution of said mechanism.

3. In a typewriting or similar machine, a carriage return mechanism comprising a constantly rotating shaft, a spring drum, an intermediate mechanism normally disconnected from the drum and shaft, a trip member carried by said mechanism, and means whereby said trip member connects the shaft and drum to return the carriage.

4. In a typewriting or similar machine, a carriage return mechanism comprising a constantly rotating shaft, a spring drum, an intermediate mechanism normally disconnected from the drum and shaft, a trip member carried by said mechanism, means whereby said trip member connects the shaft and drum when released, and means for releasing said trip member.

5. In a typewriting or similar machine, a carriage return mechanism comprising a constantly rotating shaft, a spring drum, an intermediate mechanism normally disconnected from the drum and shaft, a trip member carried by said mechanism, means whereby said trip member connects the shaft and drum when released, and manual means for releasing said trip member.

6. In a typewriting or similar machine, a carriage return mechanism comprising a constantly rotating shaft, a spring drum, an intermediate mechanism normally disconnected from the drum and shaft, a trip member carried by said mechanism, means whereby said trip member connects the shaft and drum when released, and both manual and automatic means for releasing said trip member.

7. In a typewriting or similar machine, a carriage return mechanism comprising a fixed shaft, a drum connected to the carriage and mounted to rotate on said shaft, a power driven hollow shaft rotating on the fixed shaft, an intermediate mechanism mounted to rotate on said shaft, means for normally holding said mechanism against rotation, and means for releasing the holding means.

8. In a typewriting or similar machine, a carriage return mechanism comprising a fixed shaft, a drum connected to the carriage and mounted to rotate on said shaft, a power driven hollow shaft rotating on the fixed shaft, an intermediate mechanism mounted to rotate on said shaft, means for normally holding said mechanism against rotation, means for releasing the holding means, and means whereby said mechanism when released operates to connect the drum to the power driven hollow shaft.

9. In a typewriting or similar machine, a carriage return mechanism comprising a fixed shaft, a drum connected to the carriage and mounted to rotate on said shaft, a power driven hollow shaft rotating on the fixed shaft, an intermediate mechanism mounted to rotate on said shaft, means for normally holding said mechanism against rotation, and manual and automatic means for releasing the holding means.

10. In a typewriting or similar machine, a carriage return mechanism comprising a fixed shaft, a drum connected to the carriage and mounted to rotate on said shaft, a power driven hollow shaft rotating on the fixed shaft, an intermediate mechanism mounted to rotate on said shaft, means for normally holding said mechanism against rotation, and means for releasing the holding means which insures automatic re-engagement of the holding means and said mechanism upon one complete rotation of the latter.

11. In a typewriting or similar machine, a carriage return mechanism comprising a fixed shaft, a drum connected to the carriage and mounted to rotate on said shaft, a constantly rotating hollow shaft mounted on said fixed shaft, an intermediate mechanism also mounted to rotate on the fixed shaft, a trip carried thereby, and means for normally holding the trip in inoperative position.

12. In a typewriting or similar machine, a carriage return mechanism comprising a fixed shaft, a drum connected to the carriage and mounted to rotate on said shaft, a constantly rotating hollow shaft mounted on said fixed shaft, an intermediate mechanism also mounted to rotate on the fixed shaft, a trip carried thereby, means for normally holding the trip in inoperative position and the mechanism against rotation, and means for releasing said holding means.

13. In a typewriting or similar mechine, a carriage return mechanism comprising a fixed shaft, a drum connected to the carriage and mounted to rotate on said shaft, a constantly rotating hollow shaft mounted on said fixed shaft, an intermediate mechanism also mounted to rotate on the fixed shaft, a trip carried thereby, means for normally holding the trip in inoperative position and the mechanism against rotating, and automatic means for releasing said holding means when the carriage reaches a predetermined point in its travel.

14. In a typewriting or similar machine, a carriage return mechanism comprising a fixed shaft, a drum connected to the carriage, a constantly rotating hollow shaft, and an intermediate mechanism, all of said parts mounted to rotate on the fixed shaft, a trip pivotally carried by the intermediate mechanism and adapted when in operative position to form a connection between the drum and the hollow shaft, and means for holding the intermediate mechanism stationary and the trip in inoperative position.

15. In a typewriting or similar machine, a carriage return mechanism comprising a fixed shaft, a drum connected to the carriage, a constantly rotating hollow shaft, and an intermediate mechanism, all of said parts mounted to rotate on the fixed shaft, a trip pivotally carried by the intermediate mechanism and adapted when in operative position to form a connection between the drum and the hollow shaft, means for holding the intermediate mechanism stationary and the trip in inoperative position, and means for releasing the holding means.

16. In a typewriting or similar machine, a carriage return mechanism comprising a fixed shaft, a drum connected to the carriage, a constantly rotating hollow shaft, and an intermediate mechanism, all of said parts mounted to rotate on the fixed shaft, a trip pivotally carried by the intermediate mechanism and adapted when in operative position to form a connection between the drum and the hollow shaft, means for holding the intermediate mechanism stationary and the trip in inoperative position, and manual and automatic means for releasing the holding means.

17. In a typewriting or similar machine, a carriage return mechanism comprising a fixed shaft, a drum connected to the carriage, a constantly rotating hollow shaft, and an intermediate mechanism, all of said parts mounted to rotate on the fixed shaft, a trip pivotally carried by the intermediate mechanism and adapted when in operative position to form a connection between the drum and the hollow shaft, means for holding the intermediate mechanism stationary and the trip in inoperative position, and automatic means for releasing the holding means when the carriage reaches a predetermined point in its travel.

18. In a typewriting or similar machine, a power driven carriage return mechanism comprising a constantly running member, a drum connected to the carriage, means for connecting said member to the drum and normally disconnected from both, key operated mechanism for controlling said means, and means whereby the key operated mechanism is disconnected from said means regardless of continued pressure upon the key.

19. In a typewriting or similar machine, a power driven carriage return mechanism comprising a drum, means for connecting the drum as desired to the power, a tape on said drum, a sliding rod to which said tape is connected, a vertical shaft on the carriage to which said rod is connected and line space mechanism operated by said vertical shaft.

20. In a typewriting or similar machine, a power driven carriage return mechanism comprising a drum, means for connecting the drum as desired to the power, a tape on said drum, a sliding rod to which said tape is connected, a vertical shaft on the carriage to which said rod is connected, line space mechanism operated by said vertical shaft, and a spring for returning said shaft to normal position.

21. In a typewriting or similar machine, a power driven carriage return mechanism, means for connecting said mechanism to the carriage comprising a tape and a sliding rod, brackets on said carriage, a vertical shaft mounted in said brackets the lower end of which is connected to the sliding rod, and line space mechanism connected to the upper end of said shaft.

22. In a typewriting or similar machine having a carriage and tabulating mechanism therefor, a power driven carriage return mechanism, a zone over which the carriage travels and at the end of which said mechanism becomes automatically operative, and means for preventing the operation of the tabulating mechanism in said zone.

23. In a typewriting or similar machine, a power driven carriage return mechanism, a tabulating mechanism, and a special carriage carried stop provided with means to prevent operation of the tabulating mechanism when the carriage return mechanism is about to become operative automatically.

24. In a typewriting or similar machine, a power driven carriage return mechanism, means for causing the return mechanism to operate automatically at a predetermined point, a tabulating mechanism, and means for preventing the operation of the tabulating mechanism as the carriage approaches said predetermined point.

25. In a typewriting or similar machine, a power driven carriage return mechanism, means for causing the return mechanism to operate automatically at a certain point, a tabulating mechanism comprising a series of stops on the carriage, and a special stop to prevent operation of the tabulating mechanism as the carriage approaches said certain point.

26. In a typewriting or similar machine having a carriage return mechanism and a key board provided with the usual type key levers, the combination of a return key lever, a back space key lever, both of said levers being mounted and operative independently of the type key levers, and means for preventing the operation of either the return key lever or the back space key lever except when the other is in normal position.

27. In a typewriting or similar machine having a carriage return mechanism and a key board provided with the usual type key levers, the combination of a return key lever, a back space key lever, both of said levers being mounted and operative independently of the type key levers, and means for preventing the operation of the return key lever except when the back space key lever is in normal position.

28. In a typewriting or similar machine having a carriage return mechanism and a key board provided with the usual type key levers, the combination of a return key lever, a back space key lever, both of said levers being mounted and operative independently of the type key levers, and means for preventing the operation of the back space key lever except when the return key lever is in normal position.

29. In a typewriting or similar machine having a carriage return mechanism, a return key lever, a back space key lever, a rock shaft operated by the back space key lever, and elements carried by the rock shaft and the return key lever which move in intersecting paths, thereby preventing the simultaneous operation of both levers.

30. In a typewriting or similar machine having a carriage return mechanism, a return key lever, a back space key lever, a rock shaft operated by the back space key lever, a finger carried by the rock shaft, and a lug on the return key lever adjacent the finger, said finger and lug moving in intersecting paths.

31. In a typewriting or similar machine having a carriage return mechanism, a return key lever, a back space key lever, a rock shaft operated by the back space key lever, a finger carried by the rock shaft, and a lug on the return key lever adjacent the finger, a depression of the back space key lever moving the finger above said lug, and a depression of the return key lever moving the lug in the rear of said finger, thus preventing the operation of either lever unless the other is in normal position.

In testimony whereof, we have hereunto subscribed our names.

LEWIS C. MYERS.
GEORGE F. HANDLEY.